May 17, 1938. C. K. TEXTOR 2,117,774
PORT CLOSURE DEVICE
Filed May 4, 1936
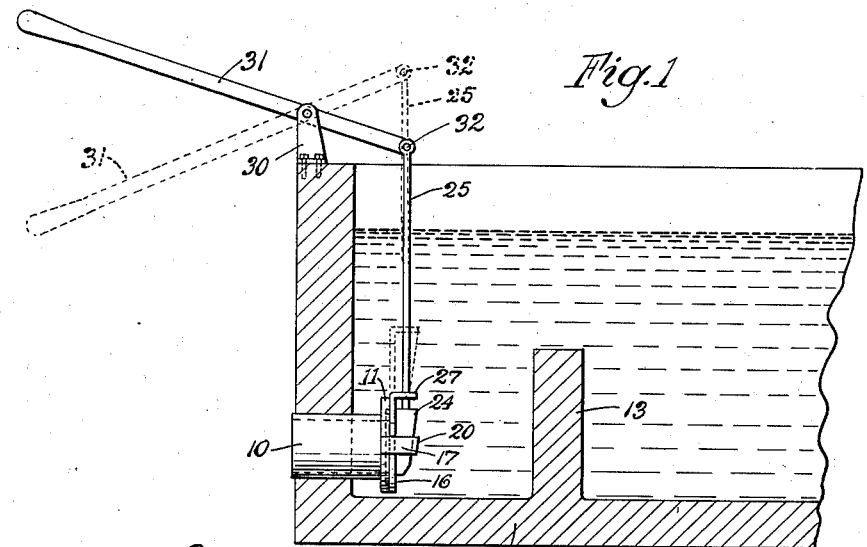
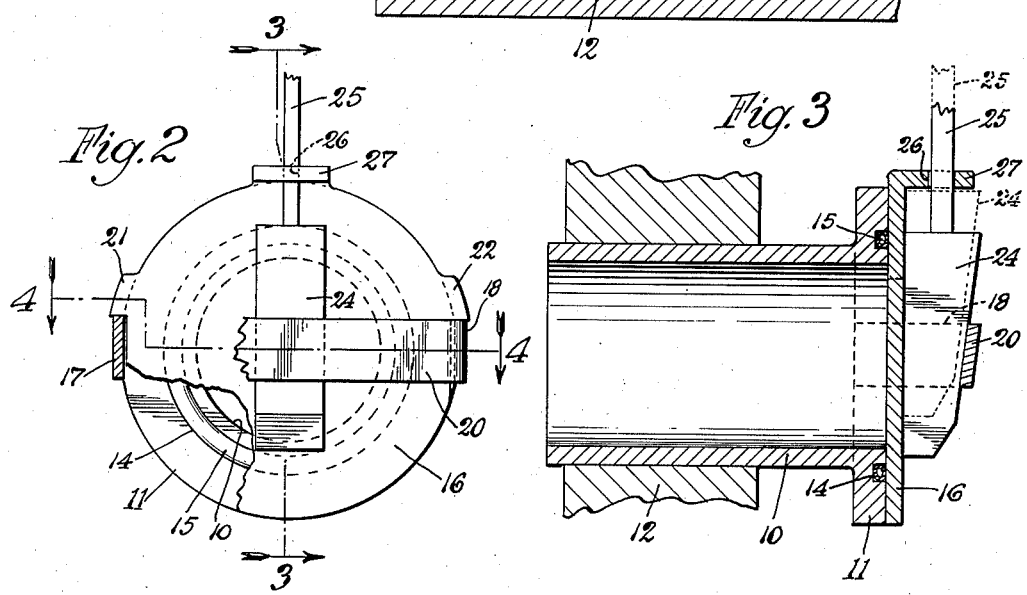
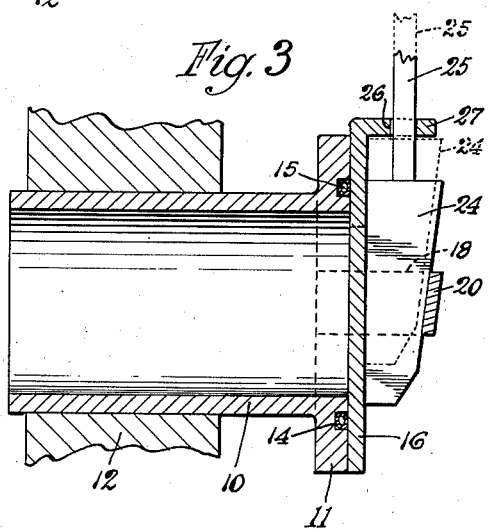
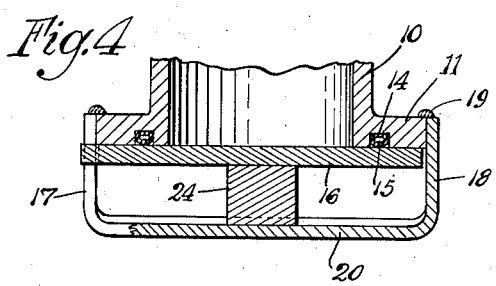
Inventor
Clinton K. Textor
by W. Bartlett Jones
Attorney.

Patented May 17, 1938

2,117,774

UNITED STATES PATENT OFFICE 2,117,774

PORT CLOSURE DEVICE

Clinton K. Textor, Cloquet, Minn., assignor to The Northwest Paper Company, Cloquet, Minn., a corporation of Minnesota Application May 4, 1936, Serial No. 77,671

1 Claim. (Cl. 251—56)

The present invention relates to port closures or gates for controlling the flow of fluid as into or out of a tank, pipe, or the like. It has particular application to water tanks, such as may be used for settling systems in water purification.

The object of the invention is to provide a simple inexpensive, yet efficient closure for an orifice or port, which is capable of ready access to free the same if it becomes "frozen" from disuse, to repair the same, or to renew the packing therein.

The device may be made in numerous ways embodying the principle of the structure set forth in the accompanying drawing in which Fig. 1 represents a water settling tank in cross section equipped with the device.

Fig. 2 is a front elevation of the device partly in cross section.

Fig. 3 is a vertical cross section on line 3—3 of Fig. 2.

Fig. 4 is a horizontal cross section on line 4—4 of Fig. 2.

The invention provides for an orifice or port to be closed by a cover or closure member with a suitable gasket, and a wedge means for holding the closing member in closing position.

In the preferred embodiment, the orifice is provided by the opening in the end of a pipe 10 having a marginal flange 11. The pipe is set into the wall of a water tank 12 which has a low partition 13 therein as an incident to its use as a settling tank. The flange 11 provides a convenient seat for the closure member and also a convenient place to locate a gasket. In the embodiment illustrated, the flange is provided with an annular groove 14 in its face, into which a length of ordinary rubber hose 15 is inserted as a gasket or packing or direct seat for a closure member 16.

The member 16 in size is sufficient to cover the area of the gasket, but preferably larger and substantially the same as the area of the flange. Guide means are provided to aid in seating the plate. These are combined with means for permitting a wedging action to close the plate, and likewise may serve as stop means to arrest transverse movement of the plate during the port closing operation. Altogether these functions are performed by a yoke of U-shape spanning the orifice. The yoke has parallel side arms 17 and 18 welded to the edges of the flange at diametrically opposite places, some welding being indicated at 19. The base 20 of the yoke may be generally parallel with the face of the flange, but in the form illustrated it is slightly inclined to provide a tapered abutment for a movable wedge member as clearly shown in Fig. 3.

The closure member 16 is provided with ears or lugs 21 and 22 which during the port closing operation come to rest on the yoke arms 17 and 18, which thus provide stops for arresting downward movement of the plate in port registering position.

The sealing action is obtained by a wedge 24 which in cooperation with the abutment provided by the base 20 of the yoke, acts on the plate 16 to jam or press the plate into place. The wedge 24 may be used as a carrier for the plate by a suitable connection. A rod 25 carries the wedge to lift it up and to jam it down. Rod 25 passes loosely through a recess, such as a hole 26 in a lug 27 projecting from the plate at the top. The relation is such that the top of the wedge engages the lower face of the lug to lift the closure member when the wedge is lifted a certain amount indicated in Fig. 3 by the space appearing between them. This lost motion connection provides for the release of the closure member 16 by the wedge 24 in the first portion of the port opening operation, and for the return of the closure member into alinement with the port prior to the final portion of the closing operation.

Various operating means may be provided in addition to the rod 25, and this may depend upon the place of use. In the form shown, a bracket 30 is mounted on top of the wall of tank 10, with a pivoted arm or lever 31. The end over the inside of the tank is pivoted at 32 to the rod 25.

To open the port or orifice of the tank the handle end of the lever 31 is moved downwardly, which movement effects the elevation of the rod and the wedge 24. Initial movement of the wedge releases the closure member and as the wedge rises, it engages the lug 27 and carries the closure member out of port closing position an extent depending on the degree of movement of the lever 31. Upon reversing the movement of the lever to close the port, the rod 25 lowers the closure member until movement of the latter is arrested, in registration or axial alinement with the port, by the engagement of ears 21, 22 with the yoke arms 17, 18, respectively. Due to the lost motion connection provided between the closure member and the operating rod 25, the latter can continue moving independently of the closure member and thus effect the cooperation of the wedge members to force the closure member axially of the port into sealing contact with the gasket. This axial movement of the closure member compresses the gasket uniformly and without any tendency to abraid it or dislodge it from its seat.

While I have shown and described an embodiment of the invention which is simple in construction and operation and affords convenient accessibility for renewal of the gasket, I do not wish to be restricted specifically to the illustrated form of the invention except as so limited by the appended claim.

I claim:

A closure mechanism for a port lying substantially in a vertical plane comprising a member providing a port opening, a closure plate adapted to fit over the port, a fixed yoke encompassing the port and closely encompassing the plate as a guide while permitting movement of the plate between the port and the yoke and also vertical movement of the plate within the yoke, means on the plate operable to engage the yoke positively to limit the downward position of the plate inside the yoke to the port closing position of the plate, a vertical thrust rod having a wedge end located between the plate and the yoke and movable to push the plate against the port, and a loose connection between the rod and the plate whereby the plate is carried by the rod with considerable vertical play permitting wedging action of the rod when the plate is in its lowermost position, and permitting opening of the port without raising the plate.

CLINTON K. TEXTOR.